UNITED STATES PATENT OFFICE.

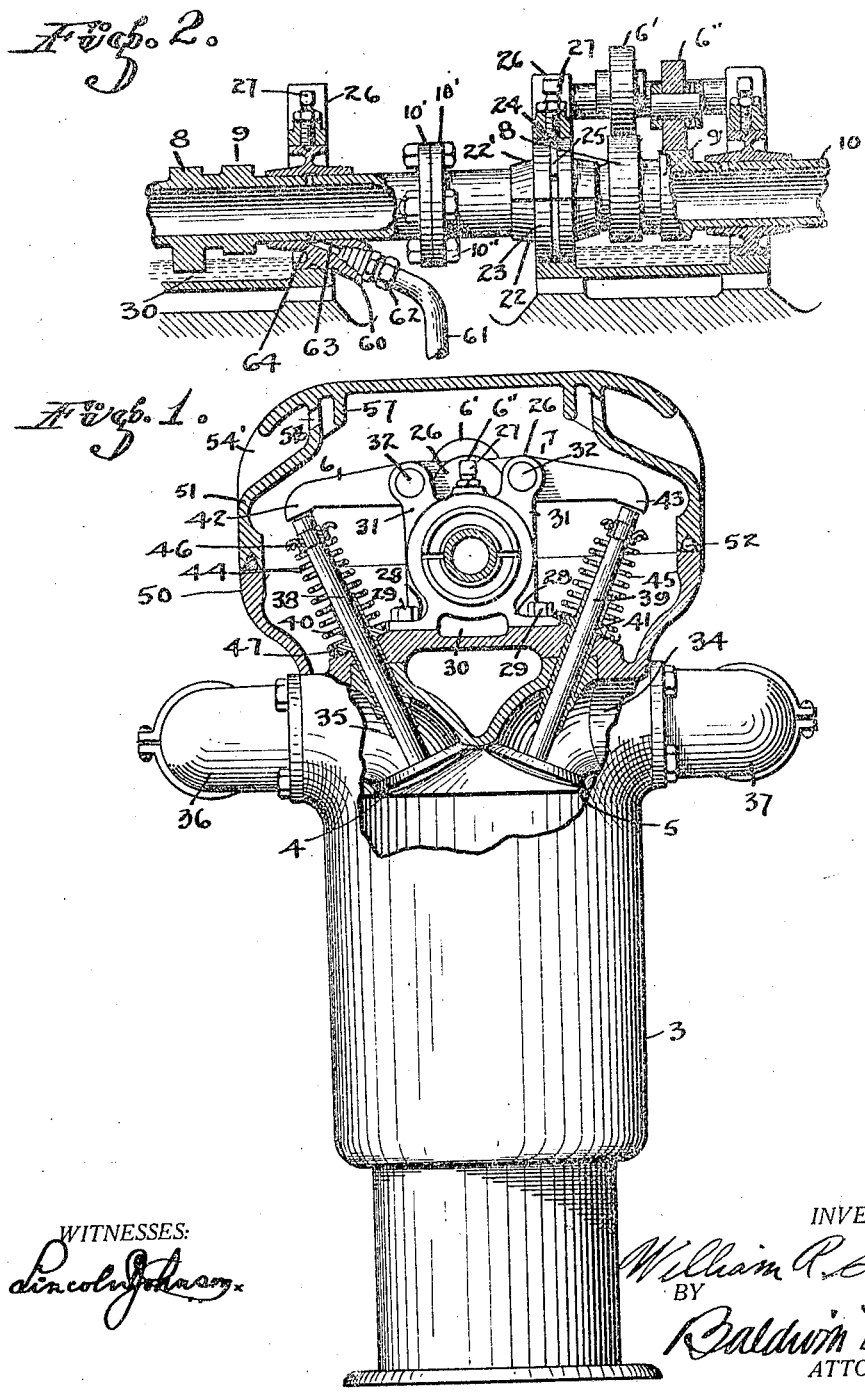

WILLIAM R. GORHAM, OF ALAMEDA, CALIFORNIA.

INTERNAL-COMBUSTION MOTOR.

1,291,838.  Specification of Letters Patent.  Patented Jan. 21, 1919.

Application filed June 7, 1916. Serial No. 102,299.

*To all whom it may concern:*

Be it known that I, WILLIAM R. GORHAM, a citizen of the United States, residing in the city of Alameda, county of Alameda, and State of California, have made a new and useful invention, to-wit: Improvements in Internal-Combustion Motors; and I do hereby declare the following to be a clear, full, concise, and exact description of the same.

This invention relates more particularly to the valve mechanism of the motor.

In this specification and the annexed drawings I illustrate the invention in the form that I consider the best, but it is to be understood that I do not limit myself to this form because the invention may be embodied in other forms, and it is also to be understood that in and by the claim following the description, I desire to cover the invention in whatever form it may be embodied.

In the accompanying two sheets of drawings:

Figure 1 is an end elevation of the same partially in cross section taken on the line II—II of Fig. 1.

Fig. 2 is a fragmentary side elevation in cross section illustrating the cam shaft and valve mechanism illustrating the manner of their attachment as in Fig. 2 to the engine cylinder.

In detail the construction illustrated in the drawings includes the crank case designated in its entirety by the numeral 1, having the crank shaft 2 journaled therein in suitable bearings. The cylinders 3, six in number, are bolted to the crank case and have pistons reciprocable therein and connected to the crank shaft by connecting rods in the usual manner. The cylinders are provided with the inlet and outlet valves 4 and 5, common to the four cycle type of internal combustion motors. These valves are operated by the rocker arms 6 and 7. These arms are actuated by the cams 8 and 9 on the cam shaft 10, journaled in bearings mounted on top of the cylinder. This cam shaft is driven synchronously with the crank shaft by the gear 11 fixed thereon and enmeshing with the pinion 12 on the vertical shaft 13 having a pinion 14 on the opposite end thereof enmeshing with the driving gear 15 fixed on the crank shaft, to time the opening and closing of the valve synchronously with the reciprocation of their respective pistons. The vertical shaft 13 is journaled in the ball bearings 16 and 17 fixed in the housing 18 attached to the crank shaft by the bracket 19 and to the valve housing by the bracket 20. This housing is provided with the ball bearing 21 supporting the outer end of the cam shaft 10.

The cam shaft 10 is journaled in separable annular bearings 22, 22'. These bearings are composed of suitable anti-friction metal such as bronze, babbit, or the like, having the integral annular flange 23 provided a concentric annular groove 24 therein to receive the garter spring 25 embedded in the groove and adapted to hold the parts 22 and 22' in assembly. The separable bearings are fixed in the brackets 26—26 bored co-axially with the cam shaft to receive the bearing fixed therein by the set screws 27 engaging the annular flange 23. The brackets 26 are provided with the integral seat 28 by which they are fixed to the head of cylinders by the cap screws 29. The brackets 26 are cross connected at the bottom by the integral oil trough 30 and are provided at the top with the rocker arm brackets 31—31 in which the pivot pins 32—32 are fixed and upon which the rocker arms 7 are pivoted. The integral block of which the brackets 26 form a part in which the whole valve operating mechanism is assembled, can be detached from the cylinders by removing the cap screws 29, and uncoupling the cam shaft 10, having the flanges 10' 10' held together by bolts 10'' passing therethrough, the cam shaft being thus coupled between each set of cylinders to permit the removal of the cam operating mechanism in sections, without disturbing the assemblage of the rocker arm and the cam shaft section.

Each cylinder is provided with the intake and exhaust passages 35, 34, leading therefrom and registering with their respective intake and exhaust manifolds 36, 37. The inner ports of these passages 34 and 35 are provided with seats for the valves 4 and 5 registering therewith. The stems 38 and 39 of these valves are guided in the bushings 40 and 41 extending through the head of the cylinder and the water jacket. The outer ends of these valve stems terminate beneath the ends 42 and 43 of their respective rocker arms. The valves are held normally closed by the expansion of the springs 44 and 45 surrounding the valve stems and expanding between the washers 46 and 47 fixed on the end of the valve stem and the head of the cylinder. The rollers 6' and 6" pivoted in the ends of their respective rocker arms 6 and 7 bear upon the cam 8—9 the contour of which they follow when the cam shaft is rotated. The contour of the cam is set and they are so placed on the cam shaft that the intake and exhaust valve will be opened and closed by their respective rocker arms, in synchronism with the reciprocation of the pistons in that particular cylinder in the usual manner.

In assembling or disassembling the sections of cam shafts from their bearings, the set screws 27—27 are backed off releasing the flanges 23—23, permitting the bearing parts 22 and 22' to be moved along the cam shaft 10 until they clear the openings of the brackets 26.

The removal of the garter spring 25 permits the parts of the bearing to be separated and removed from the shaft 10. The diameter of the flange 23 is greater than the diameter of the cam and of the flanges 10' 10' of the opposite end of the cam shaft which permits these parts to clear through the bore of the brackets 26—26. This arrangement of the bearings of the cam shaft permits an easy assembly in the brackets and also permits easy replacement of the bearing parts 22 22', should wear render that necessary.

Each cylinder or block of cylinders is provided with an upwardly extending surrounding wall 50 preferably formed integrally with the head of the cylinder or the water jacket thereon. This surrounding wall 50 forms a basin provided with a cover 51 forming an oil tight joint therewith at 52 and held in position by the knurled nut 53 threaded on the stud 54 fixed in the cylinder structure. The walls 50 and the cover 51 form a chamber entirely inclosing all of the valve operating mechanism for the purpose of retaining oil, deadening noise, excluding dirt, and incidental advantages.

For convenience in handling the covers 51, they are provided with recesses 54' having the overhanging part providing a convenient finger hold. The chamber is vented through the opening 56 to prevent accumulation of pressure within the chamber. This opening 56 is protected by the depending baffle 57 to form a trap to prevent the escape of oil vapor from within the chamber.

For the purpose of distributing lubricant, the cam shaft 10 is hollow throughout its length, or throughout the length of each section. Oil is introduced to the center of the cam shaft by forming a spud 60 on one of the bearing sections 22' into which the end of the oil conduit 61 can be screwed by means of a conventional coupling 62. Oil pumped at high pressure through the conduit 61, passes through the by-pass 63, into the oil groove of the bearing and thence to the by-passes 64 in the cam shaft into the hollow center of the cam shaft, through which it flows for distribution through other by-passes within its supporting bearings. The oil being forced into the cam shaft by way of the conduit 61 and coupling 62 under pressure escapes from the bearings in the form of an oil spray, the vapors of which accumulate in the chamber inclosing the valve mechanism and thoroughly lubricate the operating parts therein. Surplus oil accumulates in the troughs 30 into which the cams dip in their rotation, lubricating their own surfaces and throwing surplus oil onto surrounding operating mechanism. The surplus oil accumulating within the base formed by the walls 50 drains back through the drain pipe 65 into the crank case or oil reservoir from which it is pumped and kept in continuous circulation throughout the lubricating system.

Having thus described this invention, what I claim and desire to secure by Letters Patent is:

In an internal combustion engine, a cam shaft, a separable bearing for such shaft provided with a flange formed with a concentric annular groove in its base, a garter spring adapted to be positioned within such groove for holding the part of said bearing together and maintaining the same in applied position, and a bracket provided with set screw adapted to receive such bearings and to retain the same by means of the set screw in said bracket bearing against said flange.

In testimony whereof I have hereunto set my hand at San Francisco, California, this 31st day of May, 1916.

WILLIAM R. GORHAM.

In presence of—
BALDWIN VALE,
A. J. HENRY.

Copies of this patent may be obtained for five cents each, by addressing the "Commissioner of Patents, Washington, D. C."